(12) United States Patent
Pavic

(10) Patent No.: US 11,189,245 B2
(45) Date of Patent: Nov. 30, 2021

(54) SYSTEM AND METHODOLOGY FOR THE HIGH-FIDELITY DISPLAY OF ARTWORK IMAGES

(71) Applicant: Boris Pavic, Alexandria (AU)

(72) Inventor: Boris Pavic, Alexandria (AU)

(*) Notice: Subject to any disclaimer, the term of this patent is extended or adjusted under 35 U.S.C. 154(b) by 0 days.

(21) Appl. No.: 17/050,279

(22) PCT Filed: Jun. 6, 2019

(86) PCT No.: PCT/AU2019/050578
§ 371 (c)(1),
(2) Date: Oct. 23, 2020

(87) PCT Pub. No.: WO2019/232580
PCT Pub. Date: Dec. 12, 2019

(65) Prior Publication Data
US 2021/0233489 A1      Jul. 29, 2021

(30) Foreign Application Priority Data

Jun. 7, 2018  (AU) .................................. 2018902060

(51) Int. Cl.
| | |
|---|---|
| *G06T 7/90* | (2017.01) |
| *G06T 5/00* | (2006.01) |
| *G09G 5/02* | (2006.01) |
| *G03B 15/03* | (2021.01) |
| *H04N 1/60* | (2006.01) |

(Continued)

(52) U.S. Cl.
CPC ............... *G09G 5/02* (2013.01); *G03B 15/03* (2013.01); *G06T 5/001* (2013.01); *G06T 7/90* (2017.01); *H04N 1/6086* (2013.01); *H04N 9/73* (2013.01); *G09G 2320/066* (2013.01);

(Continued)

(58) Field of Classification Search
CPC combination set(s) only.
See application file for complete search history.

(56) References Cited

U.S. PATENT DOCUMENTS

| | | |
|---|---|---|
| 6,670,934 B1 | 12/2003 | Muoio et al. |
| 2002/0169773 A1 | 11/2002 | Penrod et al. |

(Continued)

OTHER PUBLICATIONS

Australian Search Report dated Feb. 15, 2019 from Australian Application No. 2018902060.

(Continued)

*Primary Examiner* — Wesner Sajous
(74) *Attorney, Agent, or Firm* — Innovation Capital Law Group, LLP; Vic Lin

(57) ABSTRACT

A system for the high-fidelity display of artwork images simulates lighting conditions (such as by, for example, varying the colour temperature, intensity, and/or lighting direction) and, for each lighting condition, compares an image of an artwork against an image of a digital display thereof. The system calculates an image adjustment (such as, for example, brightness/contrast, levels, tonal curves, exposure, vibrance, hue/saturation and/or colour balance) to minimise perceived visual differences between the original artwork and the image of a digital display thereof under the same environmental lighting conditions. As such, when displayed at a display location, the artwork image may be adjusted using the calculated image adjustment according to the actual lighting conditions at the display location.

13 Claims, 7 Drawing Sheets

(51) Int. Cl.
   *H04N 9/73*      (2006.01)
   *H04N 9/64*      (2006.01)
(52) U.S. Cl.
   CPC ............ *G09G 2320/0626* (2013.01); *G09G 2320/0666* (2013.01); *G09G 2360/144* (2013.01)

(56) References Cited

U.S. PATENT DOCUMENTS

| | | |
|---|---|---|
| 2006/0139479 A1 | 6/2006 | Dicarlo et al. |
| 2011/0157417 A1 | 6/2011 | Wang et al. |
| 2012/0182276 A1 | 7/2012 | Kee |
| 2013/0271438 A1* | 10/2013 | Aflatooni ............ G09G 3/3466 345/207 |
| 2014/0232903 A1* | 8/2014 | Oshima .............. H04N 5/23206 348/229.1 |
| 2016/0111062 A1 | 4/2016 | Hicks |

OTHER PUBLICATIONS

International Search Report & Written Opinion dated Aug. 29, 2019 from PCT Application No. PCT/AU2019/050578.

\* cited by examiner

SYSTEM AND METHODOLOGY FOR THE HIGH-FIDELITY DISPLAY OF ARTWORK IMAGES

FIELD OF THE INVENTION

This invention relates generally to a system for the high-fidelity display of artwork images across an image dissolution network.

BACKGROUND OF THE INVENTION

Ambient light-based image adjustment systems such as that which is disclosed in US 2016/0111062 A1 (INTEL CORPORATION) 21 Apr. 2016 [hereinafter referred to as D1] captures images along with ambient lighting data so that, at a display location, the display of the images can be adjusted according to an actual ambient lighting condition.

For example, according to D1, an image may be captured of a red sweater but, because, for example, the ambient lighting of the display environment may be strongly blue, blue can be added to the image of the red sweater to display the sweater to account for the users eye adaptation of the blue environment. As such, the adjustment performed may correct a maladaptation of human perception resulting from a mismatch in the colour temperature of the display and the ambient illumination present around the display device.

The present invention seeks to provide a system for the high-fidelity display of artwork images, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a system for the high-fidelity display of artwork images which comprises simulating lighting conditions (such as by, for example, varying the colour temperature, intensity, and/or lighting direction) and, for each lighting condition, comparing an image of an artwork against an image of a digital display thereof.

The present system then calculates an image adjustment (such as, for example, brightness/contrast, levels, tonal curves, exposure, vibrance, hue/saturation and/or colour balance) to minimise perceived visual differences between the original artwork and the image of a digital display thereof under the same environmental lighting conditions.

As such, when displayed at a display location, the artwork image may be adjusted using the calculated image adjustment according to the actual lighting conditions at the display location.

Unlike D1 which is directed to adjusting for the human eye adaptation to ambient colour temperatures, the present system is specifically configured for determining the unpredictable reflectance of specific physical materials (usually paint) of original artwork under variable lighting conditions.

For example, an artwork surface may comprise physical materials (usually paint) which are usually applied in a continuous manner. We found that materials have variable physical characteristics in relation to the reflection/absorption of ambient light frequencies. When observing an artwork, human eye captures these reflected frequencies and interprets them as colour and light intensity.

These human eye interpreted colours vary under different lighting conditions in a non-predictable manner which depends on the variable nature of the physical materials used in the artwork. For example, we found that a particular type of paint from the $16^{th}$ century artwork may react differently under different lighting conditions as compared to modern paint and therefore image adjustments would need to be specifically calculated for each artwork.

As such, correcting for changes in lighting conditions of physical artwork is not as simple as D1 suggests by merely adjusting the actual display itself by, for example, adding blue to an image of a red sweater and ambient light which is strongly blue in colour.

Rather, to correctly adjust for different lighting conditions for artwork (comprising different physical materials), the present system compares the artwork alongside the digital display thereof for each ambient lighting scenario to actually "see"/visually determine the actual unpredictable variable visible lighting responses to the particular type of physical materials of the artwork and to calculate image adjustments accordingly to minimise visible aberrations therebetween.

Furthermore, the proposed solution of D1 of making comparisons with reference to a test pattern of the display location to emulate display device calibration would not be applicable for artwork because the human eye perception of colour of artwork depends on the response of the specific physical materials used of each artwork. As such, image adjustments must be calculated specifically for each individual artwork under each individual lighting condition and cannot be generically determined according to a generic test pattern as proposed by D1.

As such, as the prior art solutions do not compare visible differences between an artwork image and the digital display thereof under a number of lighting conditions to calculate image adjustments for each accordingly, the prior art, including D1, cannot account for unpredictable human eye perceptions of different types of physical materials required for the high-fidelity display of artwork.

According to one aspect, a method for the high-fidelity reproduction of artwork images comprises: generating a plurality of simulated ambient lighting parameters; controlling at least one light using a lighting controller according to the plurality of ambient lighting parameters to simulate a plurality of simulated ambient lighting conditions; for each simulated ambient lighting condition: capturing an artwork image of a physical artwork using a camera; displaying the artwork image using a studio digital display; capturing a digital display image of the studio digital display displaying the artwork image using a camera; comparing the artwork image and the digital display image to calculate at least one image parameter delta representative of a visible difference between the artwork image and the digital display image; calculating at least one image adjustment parameter to minimise the at least one image parameter delta; transmitting the artwork image along with a plurality of image adjustment parameters and respective simulated ambient lighting parameters across a wide area network; using a light sensor to sense at least one actual ambient lighting parameter of an actual ambient lighting condition at a display location; obtaining the at least one image adjustment parameter using the at least one actual ambient lighting parameter; adjusting the artwork image using the at least one image adjustment parameter to generate an adjusted artwork image; and displaying the adjusted artwork image using a display location digital display at the display location.

The method may further comprise, if the at least one image parameter delta is not below a threshold: adjusting the artwork image using the at least one image adjustment parameter to generate an interim adjusted artwork image and updating the studio digital display with the interim adjusted artwork image; capturing a further digital display image of the studio digital display displaying the interim adjusted artwork image; comparing the artwork image and the further digital display image to calculate at least one further image parameter delta representative of the visible difference between the artwork image and the further digital display image; and calculating at least one further image adjustment parameter to minimise the at least one image parameter delta.

The simulated ambient lighting parameters may comprise at least one of colour temperature, intensity and lighting direction.

For a plurality of intervals of an ambient lighting parameter type, the method may comprise generating a range of another type of ambient lighting parameter.

The method may comprise: transmitting the artwork image along with the plurality of image adjustment parameters and the respective simulated ambient lighting parameters across a wide area network to a server; transmitting the at least one actual ambient lighting parameter from the display location to the server; the server generating the adjusted artwork image; and the server transmitting the adjusted artwork image to the display location.

The method may comprise transmitting the artwork image along with the plurality of image adjustment parameters and the respective simulated ambient lighting parameters across a wide area network to a display controller at the display location wherein the display controller adjusts the artwork image using the at least one image adjustment parameter.

The method may further comprise recording an artwork orientation and, at the display location, rotating the display location digital display using a rotation actuator according to the artwork orientation.

The rotation actuator may comprise a bearing rotatably engaging an annulus of a display mount.

The at least one image adjustment parameter may comprise at least one of a brightness/contrast, RGB levels, tonal curves, exposure, vibrance, hue/saturation and colour balance image adjustment parameter.

The method may comprise generating an image adjustment layer using the at least one image adjustment parameter and applying the image adjustment layer to the artwork image to generate the adjusted artwork image.

The plurality of lights may be arranged at various angles with respect to the physical artwork and wherein the method further may comprise controlling the lighting controller to operate a subset of the plurality of lights to control lighting direction.

According to another aspect, there is provided an artwork file comprising an artwork image and an associated image adjustment model, the image adjustment model mapping at least one ambient lighting parameter to at least one calculated image adjustment parameter such that, when the artwork file is displayed using a digital display in use, the at least one ambient lighting parameter may be selected according to an actual ambient lighting parameter and the artwork image adjusted using the at least one calculated image adjustment parameter to generate an adjusted artwork image.

According to another aspect there is provided, a system for the high-fidelity reproduction of artwork images, the system comprising: a lighting controller configured for generating a plurality of simulated ambient lighting parameters and controlling at least one light using a lighting controller according to the plurality of ambient lighting parameters to simulate a plurality of simulated ambient lighting conditions; an image capture controller configured for, for each ambient lighting condition: capturing an artwork image of a physical artwork using a camera; displaying the artwork image using a studio digital display; capturing a digital display image of the studio digital display displaying the artwork image using a camera; an image adjustment controller configured for: comparing the artwork image and the digital display image to calculate at least one image parameter delta representative of the visible difference between the artwork image and the digital display image; calculating at least one image adjustment parameter to minimise the at least one image parameter delta; a display controller at a display location configured to: receive the artwork image along with a plurality of image adjustment parameters and respective simulated ambient lighting parameters across a wide area network; sense at least one actual ambient lighting parameter of an actual and would lighting condition at the display location using a sensor; and obtaining the at least one image adjustment parameter using the at least one actual ambient light in parameter, wherein the system is configured for adjusting the artwork images and the at least one image adjustment parameter to generate an adjusted artwork image and displaying the adjusted artwork image using a display location digital display.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
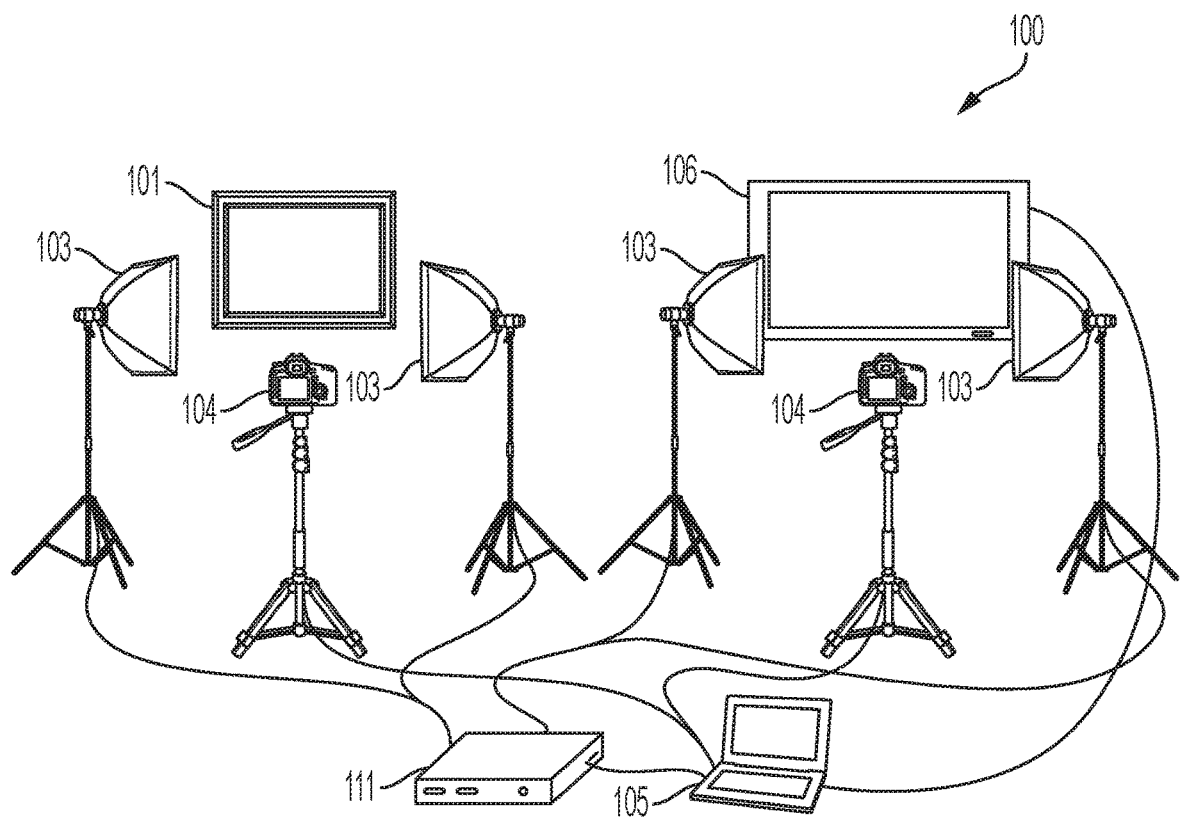
FIG. 1 shows an image capture studio in accordance with an embodiment.

FIG. 1 shows an image capture studio 100 comprising a physical artwork 101 illuminated by a plurality of lights 103. The lights 103 may be controlled by a lighting controller 111 to simulate various ambient lighting conditions according to respective ambient lighting parameters. In embodiments, the ambient lighting parameters may comprise at least one of colour temperature and intensity. Furthermore, various lights 103 may be placed at differing locations with respect to the physical artwork 101 so as to be able to control lighting from various directions also.

The lighting controller 111 may be controlled by a controller 105. The controller 105 may control the lighting controller 111 to, for example, control the lights 103 to display a plurality of colour temperature ranges such as, for example, from 2700 K to 5000 K and, for each colour temperature (such as in, for example, increments of 10 K), adjust lighting intensity from 0% (dark) to 100% (strong).

The lighting controller 111 may additionally selectively operate subsets of the lights 103 to control lighting direction. In embodiments, a radial arc of lights 103 may be provided to, for example, adjust lighting direction in 10° increments with respect to the physical artwork 101.

The studio 100 further comprises a camera 104 configured to capture artwork image data of the actual physical artwork 101 under the plurality of simulated lighting conditions.

As such, the image capture process may be automated by the controller 105 such that for each colour temperature and associated lighting intensity (and, in embodiments, lighting direction), the controller 105 may capture an associated artwork image.

The studio 100 further comprises a further camera 104 orientated towards a studio digital display 106. The digital display 106 may be a bespoke digital display with standardised calibration, the same used within end-user display locations. The digital display 106 is controlled by the controller 105 to display the captured artwork images thereon.

In embodiments, the studio 100 may similarly comprise lighting 103 to simulate lighting conditions at the digital display 106.

Figure 2:
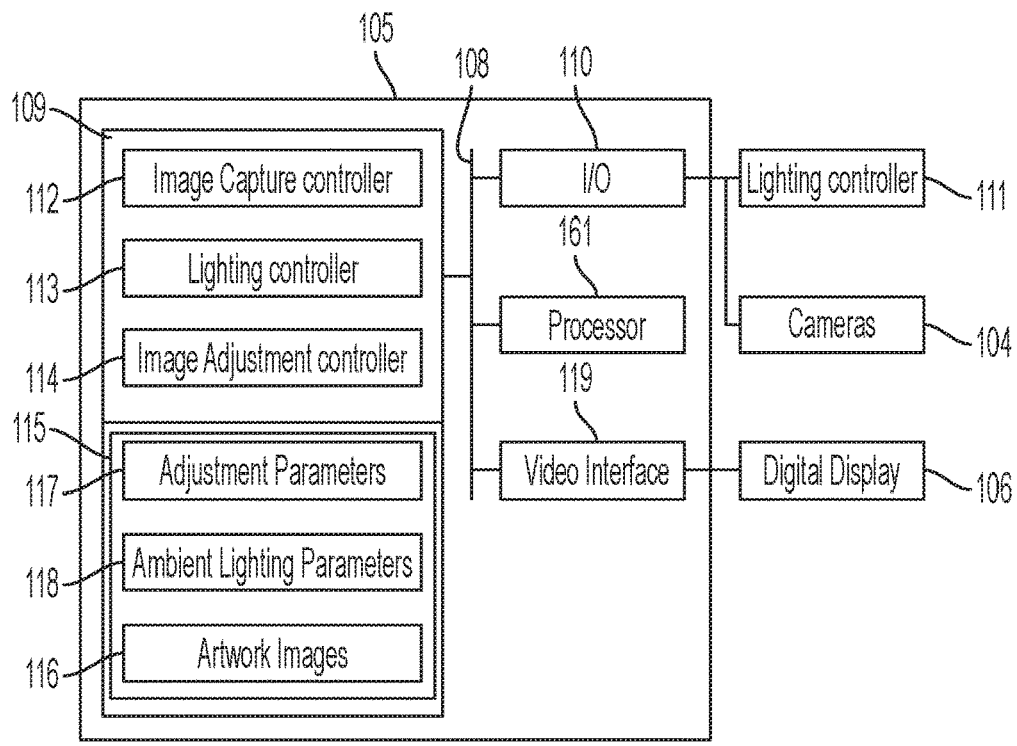
FIG. 2 shows a controller for controlling apparatus of the image capture studio in accordance with an embodiment.

With reference to FIG. 2, the controller 105 may comprise a processor 161 for processing digital data. In operable communication with the processor 161 across a system bus 108 is a memory device 109. The memory device 109 is configured for storing digital data including computer program code instructions. As such, in use, the processor 161 fetches these computer program code instructions and associated data from the memory device 109 for interpretation and execution for the implementation of the functionality described herein.

The controller 105 may comprise an I/O interface 110 interfacing the lighting controller 111 and the cameras 104.

The memory device 109 may be configured with various computer program code instructions for various controllers including an image capture controller 112 which controls the image capture process described herein, a lighting controller 113 which controls the ambient lighting condition simulations described herein and an image adjustment controller 114 which compares artwork images against digital display images thereof to calculate image adjustments as described herein.

The memory device 109 may further store artwork files 115 each of which may comprise artwork image data 116, associated adjustment models which may comprise adjustment parameters 117 stored in relation to ambient lighting parameters 118 and original artwork metadata which may include information about the original artwork orientation and other information.

The controller 105 may further comprise a video interface 119 interfacing the digital display 106.

Figure 7:
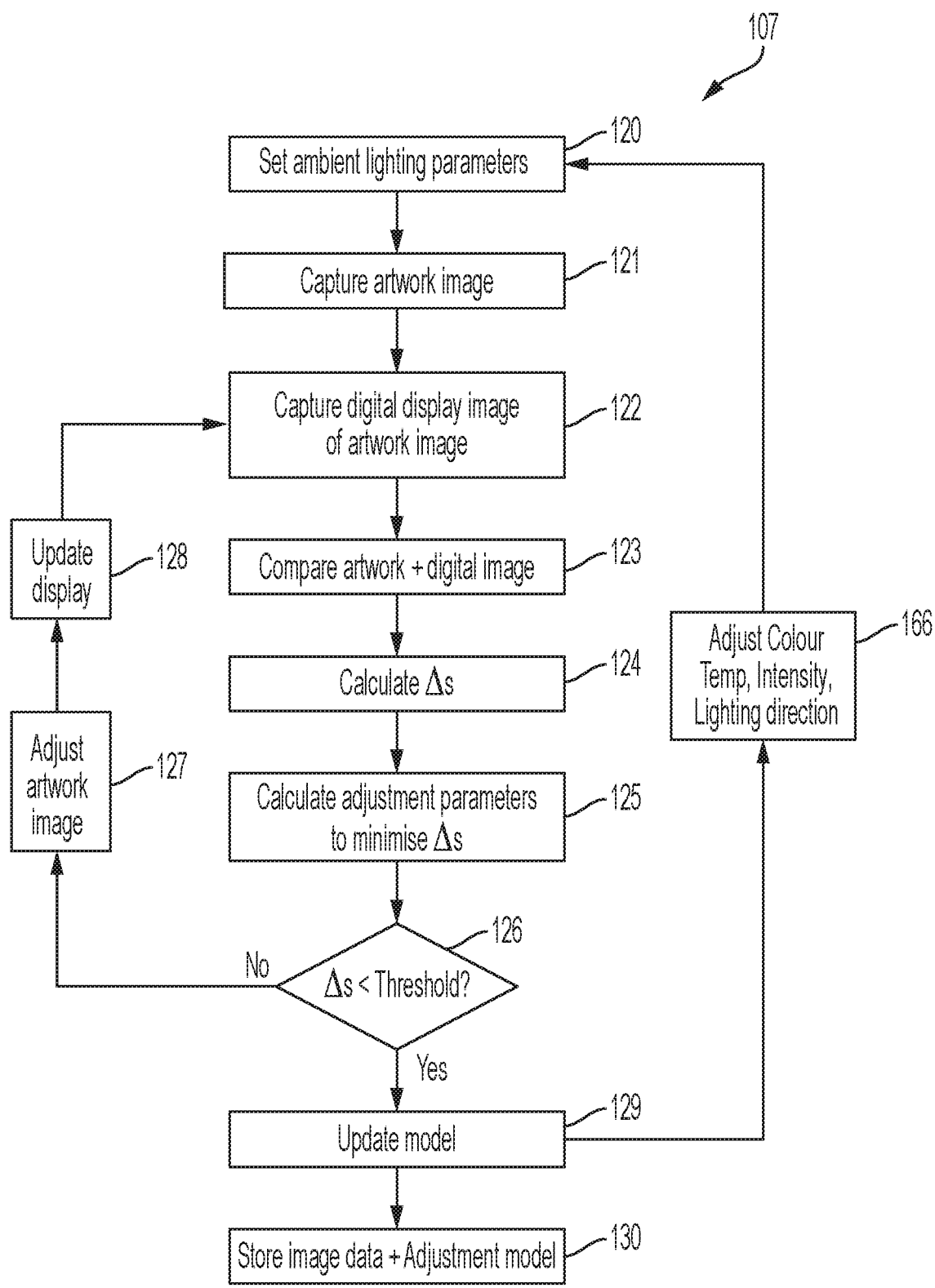
FIG. 7 illustrates the process of calculating image adjustment parameters for various simulated ambient lighting conditions in accordance with an embodiment.

FIG. 7 illustrates an artwork file creation process 107 implemented by the controller 105. The processing 107 comprises setting ambient lighting parameters at step 120 wherein the controller 105 controls the lighting controller 111 to control the lights 103 according to a plurality of simulated ambient lighting parameters to simulate a plurality of ambient lighting conditions.

As alluded to above, these simulated ambient lighting parameters may include at least one of colour temperature, intensity and lighting direction.

For each simulated lighting condition, the processing 107 comprises capturing an artwork image 121 using the camera 104 at the physical artwork 101. The artwork image 116 and the respective simulated ambient lighting parameters 118 may be stored within the memory device 109.

The controller 105 then controls the digital display 106 to display the artwork image 116 thereon. The processing 107 further comprises the controller 105 capturing a digital display image of the digital display 106 whilst displaying the artwork image at step 122 using the camera 104 at the digital display 106.

The processing 107 may further comprise using the image adjustment controller 114 to compare the artwork image 116 and the digital image captured from the physical artwork 101 and the display device 106 respectively at step 123.

The processing 107 comprising calculating at least one image parameter delta (difference) between the artwork image 116 and the digital display image at step 124. In embodiments, the image parameter delta may represent differences in brightness/contrast, levels, tonal curves, exposure, vibrance, hue/saturation and/or colour balance.

At step 125 the image adjustment controller 114 may calculate an adjustment parameter which minimises the determined image parameter delta.

If the at least one image parameter delta is not within an acceptable threshold as determined at step 126, the processing 107 may comprise adjusting the artwork image 116 at step 127 and updating the digital display 106 at step 128 whereafter the process repeats wherein a yet further digital display image is captured and compared.

At step 129 an image adjustment model may be updated with the image adjustment parameters that minimise the image parameter deltas.

Thereafter, the process may repeat through step 166 wherein the controller 106 adjusts the simulated ambient lighting parameters to generate a new simulated ambient lighting condition whereafter the process repeats until all of the simulated ambient lighting parameter permutations are complete.

Figure 5:
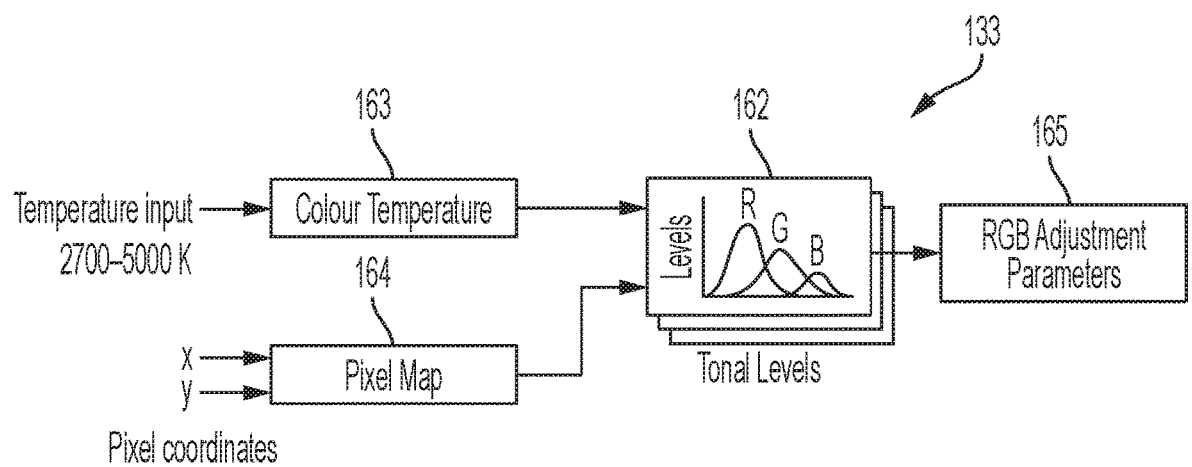
FIG. 5 shows an exemplary adjustment model mapping input colour temperature to output RGB levels of the image adjustment layers in accordance an embodiment.

Furthermore, the image adjustments may be calculated according to subset regions of an artwork determined by X,Y pixel coordinates as is illustrated in FIG. 5 described in further detail below. For example, as opposed to image adjustments being applied uniformly across the entire artwork image, the image adjustment controller 114 may calculate image adjustments which minimise image parameter deltas at various regions within the artwork image.

At step 130, the processing 107 stores the adjustment model in relation to the artwork image 116.

Figure 4:
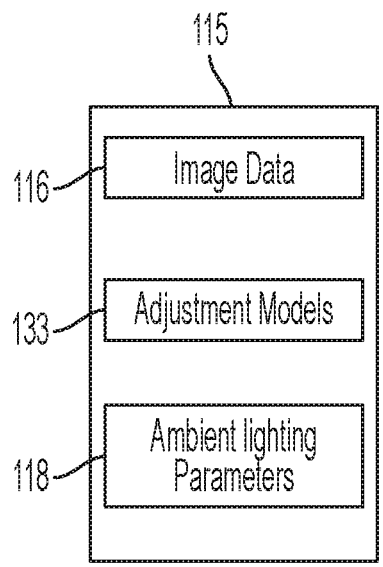
FIG. 4 shows different types of artwork files in accordance with embodiments.

FIG. 4 illustrates the generated artwork file 115 which may comprise the artwork image data 116, artwork image metadata and the adjustment models 133 stored in relation to a plurality of ambient lighting parameters 118.

Furthermore, in embodiments also as alluded to above, the adjustment models 133 may be stored in relation to subset regions within an artwork image.

Figure 3:
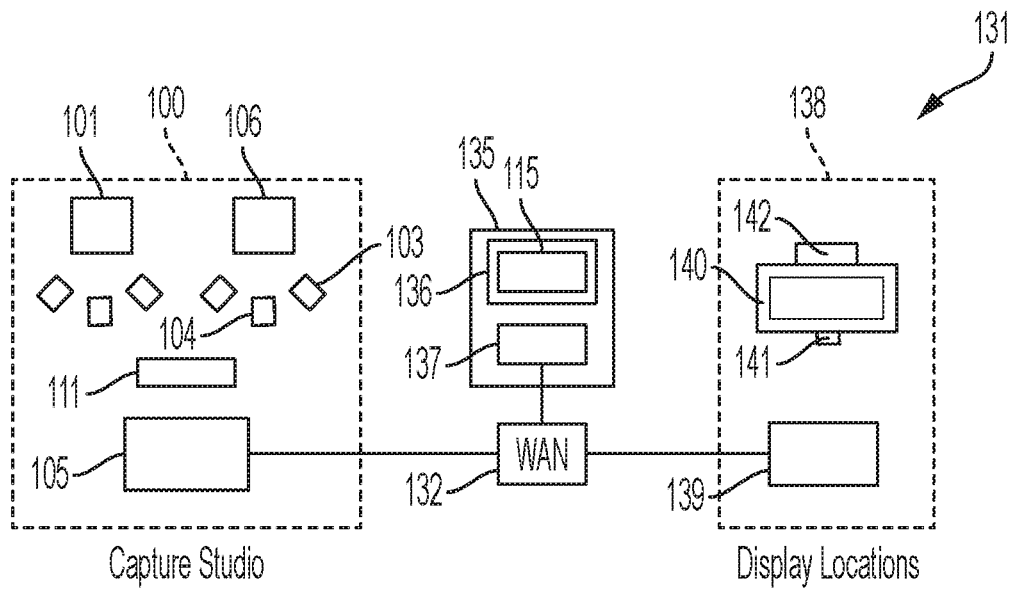
FIG. 3 shows an image distribution network in accordance with an embodiment.

FIG. 3 illustrates an image distribution network 131 across a wide area network 132.

The network 131 comprises the image capture studio 100 comprising the aforedescribed componentry of the controller 105, lighting controller 111, plurality of lights 103, cameras 104 and digital display 106 which generated the artwork files 115 for each physical artwork 101.

The network 101 may further comprise a server 135 comprising a memory device 136 having a plurality of artwork files 115 therein. The server 135 may implement a webserver 137 to facilitate the selection and retrieval of various artwork files 115 therefrom.

The network 131 may further comprise a plurality of display locations 138 which, for example, may be residential homes.

Each location 138 may comprise a display device 140 and display controller 139. In embodiments, the display device 140 is a bespoke display device 140 and the display device 106 at the studio 100 is the same type of bespoke display device 140 and wherein the bespoke display device 140 and the display device 106 at the studio 100 are calibrated with the same display configuration settings.

The display controller 139 controls the display of artwork images on a display location display device 140.

At least one light sensor 141 may sense ambient lighting conditions at the display location 138. Furthermore, in embodiments, each display location digital display 140 may comprise a rotation actuator 142 configured to rotate the display location digital display 140 between portrait and landscape orientations in accordance with orientational data within the relevant artwork file 115.

FIG. 5 illustrates an example of an adjustment model 133 which relates input colour temperature and pixel mapping to output RGB levels of image adjustment layers.

Model 133 may comprise a plurality of RGB tonal level parameter sets 162 for a colour temperature range 163 and XY pixel mappings 164.

The XY pixel mappings may represent pixels within the artwork image data 116. The colour temperature range 163 may represent ambient lighting colour temperatures from "warm" 2700 K colour temperatures being yellowish in colour to "cool" 5000 K colour temperatures being bluish.

As such, for each colour temperature for each pixel coordinate, the model 133 may output RGB adjustment parameters 165 which minimise the visual differences between the artwork image and the display image as aforedescribed.

Other adjustment models may additionally or alternatively be utilised to relate other ambient lighting parameters (including colour temperature, intensity and lighting direction) to other adjustment parameters (including brightness/contrast, levels, tonal curves, exposure, vibrance, hue/saturation and colour balance).

Figure 8:
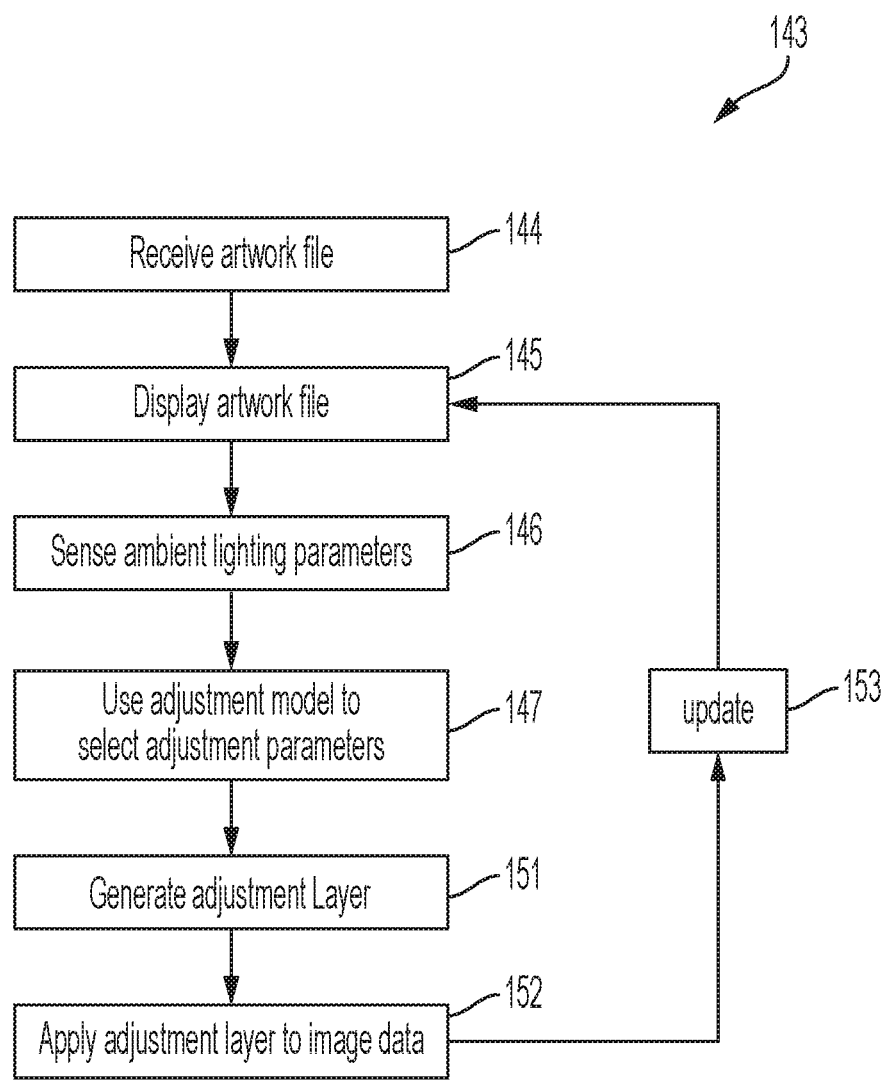
FIG. 8 illustrates the adjustment of artwork images according to ambient lighting conditions.

FIG. 8 illustrates exemplary processing 143 for the adjustment of artwork images for high-fidelity display at the display location 138.

The processing 143 may comprise the display controller 139 receiving the artwork file 115 across the wide area network 132 at step 144.

Step 145 may comprise displaying the artwork image 116 therein using the display location digital display 140.

Step 146 may comprise sensing at least one ambient lighting parameter at the display location digital display 140 using at least one light sensor 141. For example, the light sensor 141 may sense at least one of colour temperature, intensity and lighting direction.

Step 147 comprises using the associated adjustment model 133 to obtain adjustment parameters.

Figure 6:
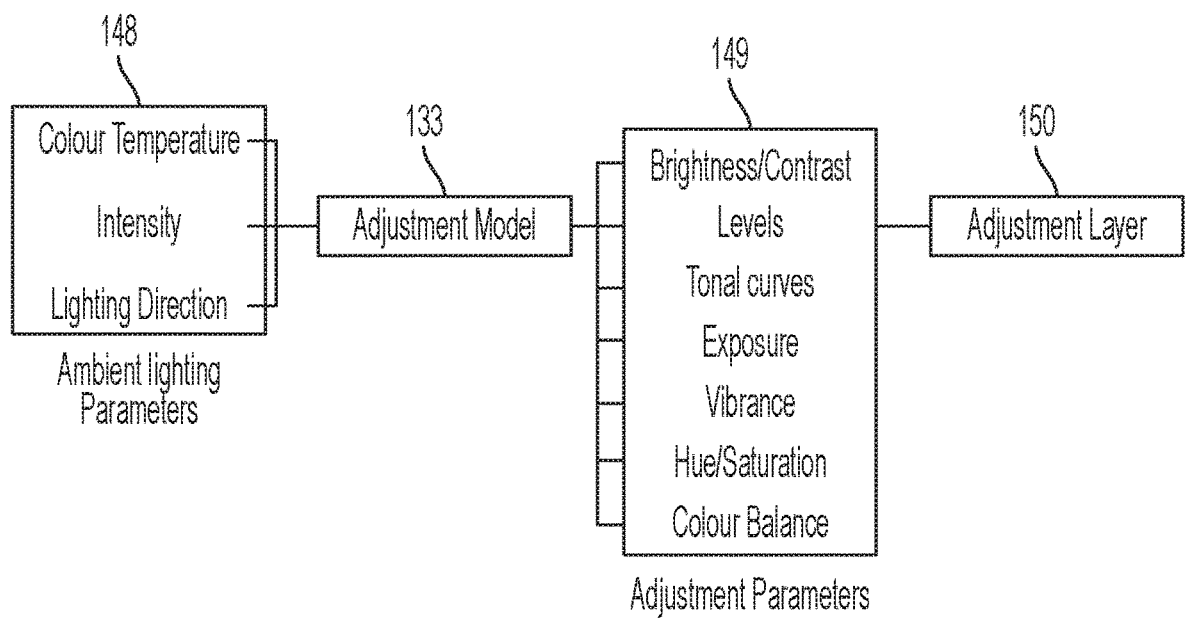
FIG. 6 illustrates using an adjustment model to obtain an adjustment layer for image adjustment in accordance with an embodiment.

In this regard, with reference to FIG. 6, the at least one ambient lighting parameter 148 (which may include at least one of colour temperature, intensity and lighting direction) may be input into the adjustment model 133. The adjustment model 133 may then output at least one image adjustment parameter 149 accordingly (which may include at least one of brightness/contrast, levels, tonal curves, exposure, vibrance, hue/saturation and/or colour balance).

These adjustment parameters 149 may be used to create an image adjustment layer 150 at step 151.

At step 152 the adjustment layer 150 is applied to the artwork image 116 to generate an adjusted artwork image and, at step 153, the display location digital display 140 is updated with the adjusted artwork image.

In preferred embodiments, the application of the adjustment layer 150 is performed by the server 135. In embodiments, the server 135 may execute a photo editing software to apply the adjustment layers 150. In alternative embodiments, the server 135 may communicate with an API of a photo editing server executing the photo editing software thereon.

As such, the display controller 139 may transmit the sensed at least one ambient lighting parameter 148 and artwork file ID to the server 135. The server 135 may then obtain the relevant adjustment parameters 149 to generate the adjustment layer 150 and generate the adjusted artwork image. The adjusted artwork image may then be sent by the server 135 to the display controller 139 for updating the display location digital display 140 accordingly. It should be noted that in this embodiment, the adjustment model 133 need not be provided to the display controller 139.

In alternative embodiments, the display controller 139 may perform the image adjustment process itself or via an external server (including one comprising a photo editing software application) via an API to generate the adjustment layer 150 according to the sensed ambient lighting parameters 148 which is then applied to the image data 116 to update the digital display 140 accordingly.

Figure 9:
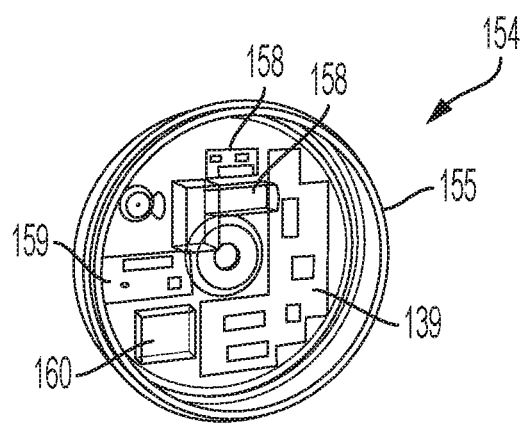
FIG. 9 shows a rotation actuator in accordance with an exemplary embodiment for engaging a display mounted as shown in FIG. 10 for rotating a digital display in the manner illustrated in FIG. 11.
Figure 10:
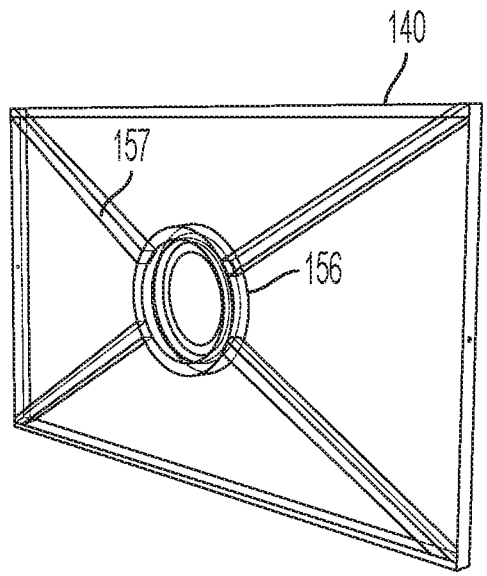

FIG. 9 shows a rotation actuator 154 which, in one embodiment, may comprise a cylindrical outer bearing 155 which rotatably engages and annulus 156 of a mounting framework 157 of the digital display 140.

Figure 11:
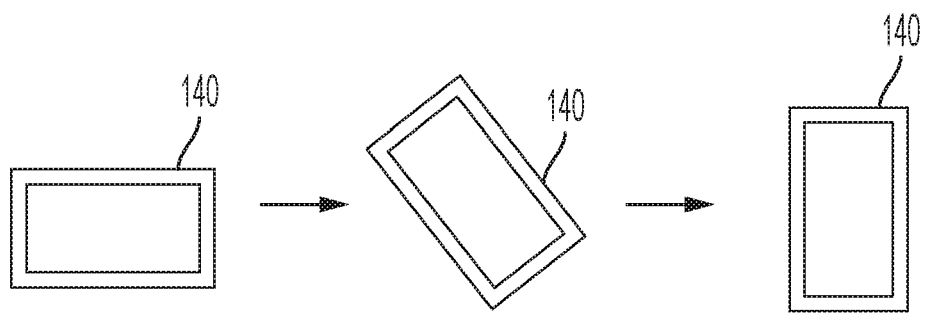

The actuator 154 may comprise a drive 158 interfacing between the bearing 155 and the annulus 156 so as to be able to rotate the annulus 156 so as to be able to rotate the digital display 140 from landscape to portrait orientation in the manner illustrated in FIG. 11 and vice versa.

The actuator 154 may comprise a controller 158 which interprets orientation data associated with the artwork file 115 to rotate the digital display 140 accordingly. In embodiments, the actuator 154 may comprise a wireless interface 159 for wireless communication (such as via Bluetooth or WiFi) to the display controller 139. In embodiments, the actuator 154 may comprise power supply unit 160.

In embodiments, the display controller 139 (or, in embodiments, the server 135) may adjust display parameters according to an age of the display location digital display 140. For example, where the display location digital display 140 is a plasma display, the blue levels thereof may diminish over time such that the display controller 139 increases the blue levels of the display accordingly.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A method for the high-fidelity reproduction of artwork images, the method comprising:
   generating a plurality of simulated ambient lighting parameters;
   controlling at least one light using a lighting controller according to the plurality of ambient lighting parameters to simulate a plurality of simulated ambient lighting conditions;
   for each simulated ambient lighting condition:
      capturing an artwork image of a physical artwork using a camera;
      displaying the artwork image using a studio digital display;
      capturing a digital display image of the studio digital display displaying the artwork image using a camera;
      comparing the artwork image and the digital display image to calculate at least one image parameter delta representative of a visible difference between the artwork image and the digital display image;
      calculating at least one image adjustment parameter to minimise the at least one image parameter delta;
   transmitting the artwork image along with a plurality of image adjustment parameters and respective simulated ambient lighting parameters across a wide area network;
   using a light sensor to sense at least one sensed ambient lighting parameter of an ambient lighting condition at a display location;
   obtaining the at least one image adjustment parameter using the at least one sensed ambient lighting parameter;
   adjusting the artwork image using the at least one image adjustment parameter to generate an adjusted artwork image; and
   displaying the adjusted artwork image using a display location digital display at the display location.

2. A method as claimed in claim 1, further comprising, if the at least one image parameter delta is not below a threshold:
   adjusting the artwork image using the at least one image adjustment parameter to generate an interim adjusted artwork image and updating the studio digital display with the interim adjusted artwork image;
   capturing a further digital display image of the studio digital display displaying the interim adjusted artwork image;
   comparing the artwork image and the further digital display image to calculate at least one further image parameter delta representative of the visible difference between the artwork image and the further digital display image; and
   calculating at least one further image adjustment parameter to minimise the at least one image parameter delta.

3. A method as claimed in claim 1, wherein the simulated ambient lighting parameters comprise at least one of colour temperature, intensity and lighting direction.

4. A method as claimed in claim 3, wherein for a plurality of intervals of an ambient lighting parameter type, the method comprises generating a range of another type of ambient lighting parameter.

5. A method as claimed in claim 1, wherein the method comprises:
   transmitting the artwork image along with the plurality of image adjustment parameters and the respective simulated ambient lighting parameters across a wide area network to a server;
   transmitting the at least one sensed ambient lighting parameter from the display location to the server;
   the server generating the adjusted artwork image; and
   the server transmitting the adjusted artwork image to the display location.

6. A method as claimed in claim 1, wherein the method comprises transmitting the artwork image along with the plurality of image adjustment parameters and the respective simulated ambient lighting parameters across a wide area network to a display controller at the display location wherein the display controller adjusts the artwork image using the at least one image adjustment parameter.

7. A method as claimed in claim 1, further comprising recording an artwork orientation and, at the display location, rotating the display location digital display using a rotation actuator according to the artwork orientation.

8. A method as claimed in claim 7, wherein the rotation actuator comprises a bearing rotatably engaging an annulus of a display mount.

9. A method as claimed in claim 1, wherein the at least one image adjustment parameter comprises at least one of a brightness/contrast, RGB levels, tonal curves, exposure, vibrance, hue/saturation and colour balance image adjustment parameter.

10. A method as claimed in claim 1, wherein the method comprises generating an image adjustment layer using the at least one image adjustment parameter and applying the image adjustment layer to the artwork image to generate the adjusted artwork image.

11. A method as claimed in claim 1, wherein a plurality of lights are arranged at various angles with respect to the physical artwork and wherein the method further comprises controlling the lighting controller to operate a subset of the plurality of lights to control lighting direction.

12. An artwork file comprising an artwork image and an associated image adjustment model, the image adjustment model mapping at least one ambient lighting parameter to at least one calculated image adjustment parameter such that, when the artwork file is displayed using a digital display in use, the at least one ambient lighting parameter is selected according to a sensed ambient lighting parameter of an ambient lighting condition at a display location and the artwork image adjusted using the at least one calculated image adjustment parameter to generate an adjusted artwork image.

13. A system for the high-fidelity reproduction of artwork images, the system comprising:
   a lighting controller configured for generating a plurality of simulated ambient lighting parameters and controlling at least one light using a lighting controller according to the plurality of ambient lighting parameters to simulate a plurality of simulated ambient lighting conditions;
   an image capture controller configured for, for each ambient lighting condition:
      capturing an artwork image of a physical artwork using a camera;

displaying the artwork image using a studio digital display;
    capturing a digital display image of the studio digital display displaying the artwork image using a camera;
an image adjustment controller configured for:
    comparing the artwork image and the digital display image to calculate at least one image parameter delta representative of the visible difference between the artwork image and the digital display image;
    calculating at least one image adjustment parameter to minimise the at least one image parameter delta;
a display controller at a display location configured to:
receive the artwork image along with a plurality of image adjustment parameters and respective simulated ambient lighting parameters across a wide area network;
sense at least one sensed ambient lighting parameter of an ambient lighting condition at the display location using a sensor; and
obtaining the at least one image adjustment parameter using the at least one sensed ambient lighting parameter, wherein the system is configured for adjusting the artwork image using the at least one image adjustment parameter to generate an adjusted artwork image and displaying the adjusted artwork image using a display location digital display.

* * * * *